UNITED STATES PATENT OFFICE.

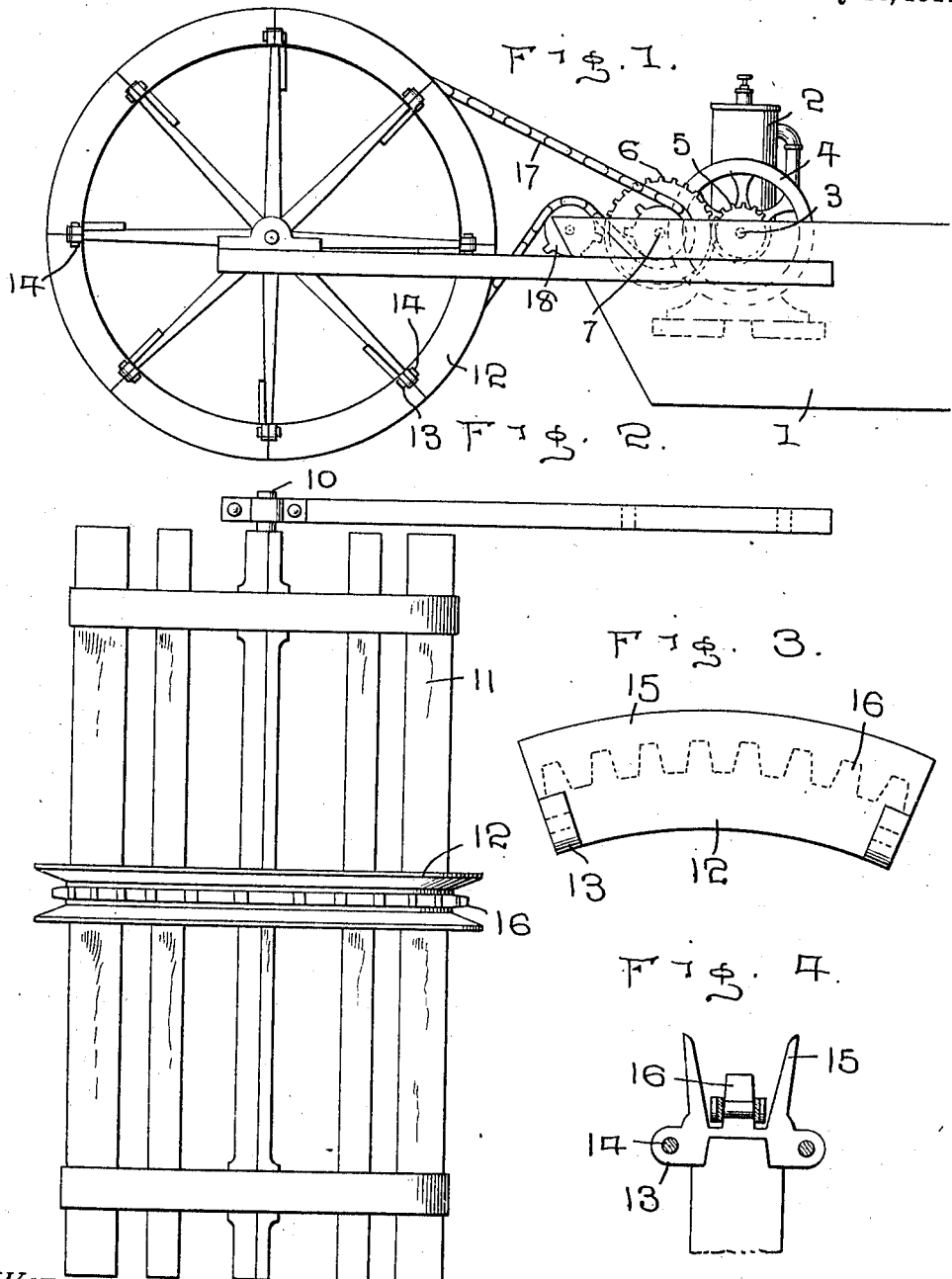

CHARLES F. BOORMAN, OF BURKETT, NEBRASKA.

PADDLE-WHEEL FOR BOAT PROPULSION.

992,154.  Specification of Letters Patent.  Patented May 16, 1911.

Application filed October 15, 1910. Serial No. 587,259.

*To all whom it may concern:*

Be it known that I, CHARLES F. BOORMAN, a citizen of the United States, residing at Burkett, State of Nebraska, have invented certain new and useful Improvements in Paddle-Wheels for Boat Propulsion; and I do hereby declare the following to be a full, clear, and exact description of the invention, such as will enable others skilled in the art to which it appertains to make and use the same.

This invention relates to boat propulsion and more particularly to paddle wheels, the object being to improve the general construction of paddle wheel and driving means, whereby a boat can be driven by the same at a high rate of speed with a small amount of horse power.

Another object of my invention is to provide a paddle wheel with a central sprocket over which the driving chain passes, whereby the end thrust is avoided.

Another object of my invention is to provide a paddle wheel which can be readily attached to any construction of boat.

With these objects in view, the invention consists in the novel features of construction, combination and arrangement of parts, hereinafter fully described and pointed out in the claim.

In the drawing forming a part of this specification, Figure 1 is a side elevation of my improved paddle wheel showing the same secured in position on the rear end of a boat. Fig. 2 is a top plan view of a paddle wheel. Fig. 3 is a side elevation of one of the sections of the sprocket wheel, and, Fig. 4 is an end view of the same.

Referring to the drawing, 1 indicates the rear end of a boat of any suitable construction having an engine 2 mounted therein provided with a power shaft 3 carrying a fly wheel 4, and a gear 5 which meshes with the gear 6 mounted on a suitable shaft which also carries a sprocket wheel 7 for the purpose later described. Secured to the respective sides of the boat are rearwardly extending arms 8 provided with bearings 9 at their outer ends in which is mounted a shaft 10 carrying a paddle wheel 11.

Arranged centrally on the paddle wheel 11 is a sprocket 12 which is formed of a plurality of sections having lugs 13 which are connected together by bolts 14, as clearly shown, and said sections are provided with side flanges 15 so that when the sections are united to form the complete sprocket, annular flanges are formed, as clearly shown, to prevent the drive chain from jumping off the sprocket teeth 16.

Mounted on the sprocket wheel 7 is a sprocket chain 17 which passes over the sprocket wheel 12 carried by the paddle wheel, and over an idle sprocket 18 carried by the boat so as to hold the same in its proper position, and it will be seen that when the engine is in motion, the paddle wheel will be driven in such a manner that the momentum of the paddle wheel will aid in producing a steady reliable movement.

From the foregoing description, it will be seen that I have provided means for driving a paddle wheel which is so constructed that the wheel which carries the sectional sprocket can be driven at a high rate of speed with a small amount of horse power. It will be seen that the paddle wheel can be readily attached to a boat of any construction, whereby a boat can be readily converted into a motor boat.

What I claim is:—

The combination with a boat having a motor installed therein, of arms secured to the sides of the boat having bearings at their rear ends, a shaft mounted in said bearings, a paddle wheel carried by said shaft, a sectional sprocket wheel secured centrally on said paddle wheel having annular side flanges, a chain passing over said sprocket wheel, a shaft driven by the engine carrying a sprocket over which said chain passes, and an idle sprocket engaging said sprocket chain.

In testimony whereof I have signed my name to this specification in the presence of two subscribing witnesses.

CHARLES F. BOORMAN.

Witnesses:
C. H. MENCK,
H. P. DOWLING.

---

Copies of this patent may be obtained for five cents each, by addressing the "Commissioner of Patents, Washington, D. C."